May 19, 1964     A. HALLIWELL     3,133,716
MOTION TRANSFER MEANS IN AIRCRAFT CONTROLS
Filed Oct. 19, 1962     4 Sheets-Sheet 1

INVENTOR.
ARNOLD HALLIWELL
BY Duane C. Bowen
ATTORNEY

May 19, 1964      A. HALLIWELL      3,133,716
MOTION TRANSFER MEANS IN AIRCRAFT CONTROLS
Filed Oct. 19, 1962      4 Sheets-Sheet 2
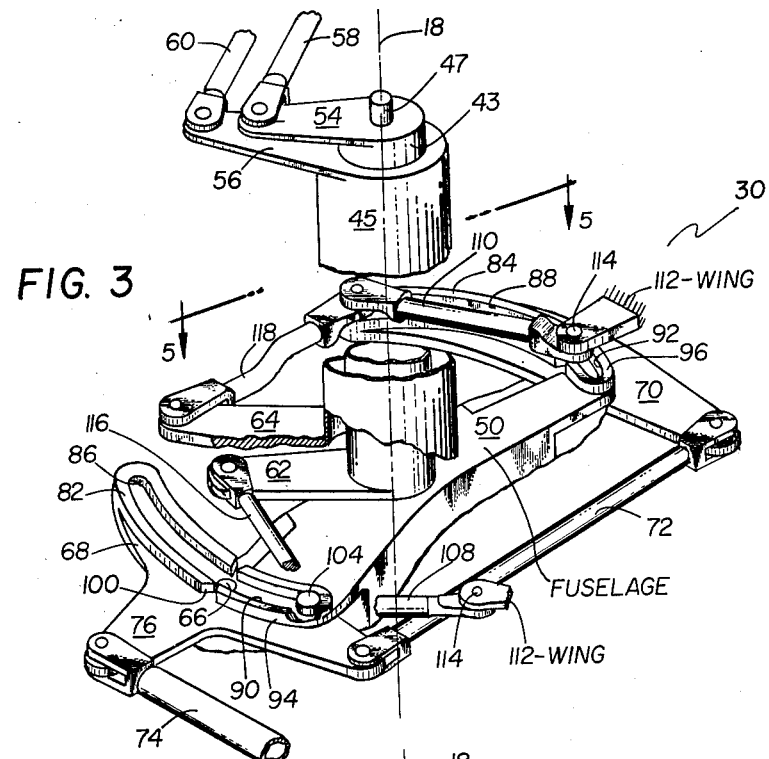
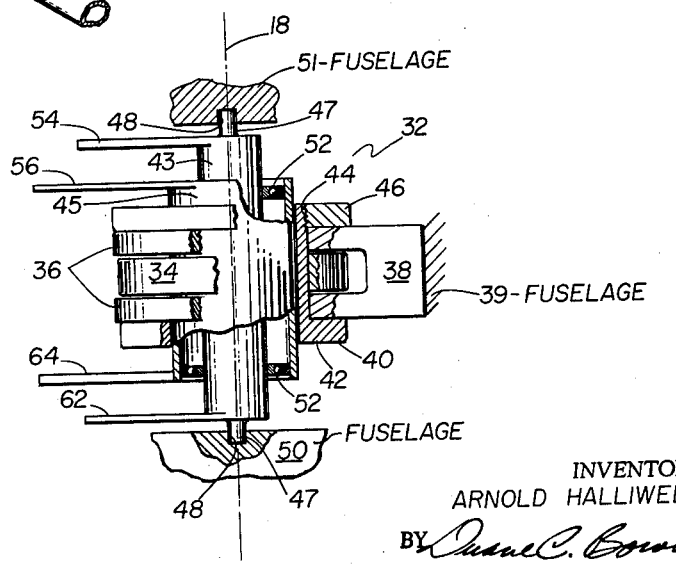
INVENTOR.
ARNOLD HALLIWELL
BY
ATTORNEY

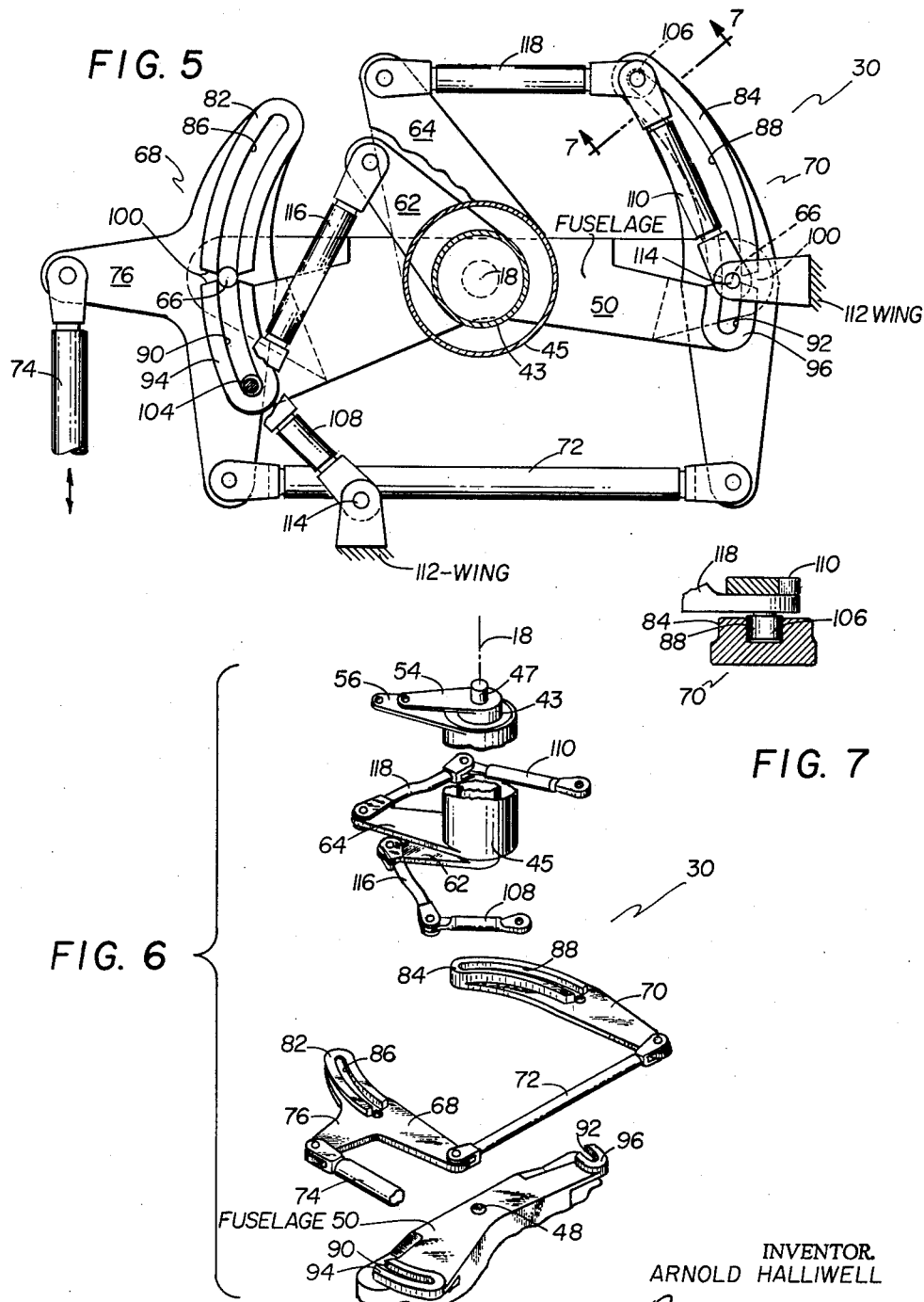

United States Patent Office 3,133,716
Patented May 19, 1964

3,133,716
MOTION TRANSFER MEANS IN AIRCRAFT
CONTROLS
Arnold Halliwell, Derby, Kans., assignor to The Boeing Company, Wichita, Kans., a corporation of Delaware
Filed Oct. 19, 1962, Ser. No. 231,668
14 Claims. (Cl. 244—75)

My invention concerns motion transfer means forming a connection between pilot operable control means and control surfaces, for aircraft having variably swept wings. The motion transfer means preferably is located adjacent the axis of pivoting between the swept wing and the structure from which it is pivoted. The motion transfer means prevents control surface movement being induced by the wing sweeping adjustment and also acts to change the responsiveness of the control surfaces to the control means. This change in responsiveness may include gradually and completely phasing out one control surface and phasing in a second control surface responsive to the same pilot operable control means. Such control surfaces could be a wing tip control surface and a medial trailing control surface for lateral control, respectively, in maximum and minimum sweep positions responsive to the stick.

One problem with most control systems if incorporated in variably swept wings is movement of control surfaces responsive to the sweeping action. Control surfaces having the common cable connections or linkages normally would have such deflection during wing sweeping. It is an objective of the invention to prevent such deflection. A second problem is that substantial amounts of wing sweeping may change the effectiveness of control surfaces so that it may be desirable to change the responsiveness of the control surfaces to pilot operable control means for various wing swept positions or to completely phase out one control surface and phase in another control surface. It is an objective of my invention to accomplish such purposes.

Additional objectives of my invention include: to provide such motion transfer means that additionally may have application to V/STOL aircraft having wings pivoted about a horizontal axis or may have application to other pivotally adjustable airfoils; to provide a simple, reliable, lightweight and economical motion transfer system accomplishing the above and other purposes; to provide such a system having adaptability to particular aircraft designs that may require concentration of the equipment on the wing pivot axis or, conversely, minimization of structure adjacent to the wing pivot axis, to provide room for other connections such as fluid lines that may need to pass through the area of the axis.

Further objectives and advantages of my invention will be understood from the following description, read with reference to the drawings, in which:

FIGURE 3 is an enlarged, fragmentary perspective view of a specific embodiment of my motion transfer means.

FIGURE 4 is an elevational view of a portion of the motion transfer means and wing pivot structure, fragmentary and partly in section.

FIGURE 5 is a plan view, partly in section, taken on line 5—5 of FIGURE 3.

FIGURE 6 is an exploded perspective view of the motion transfer assembly.

FIGURE 7 is an elevational view, fragmentary and partly in section, taken on line 7—7 of FIGURE 5.

Figure 1:
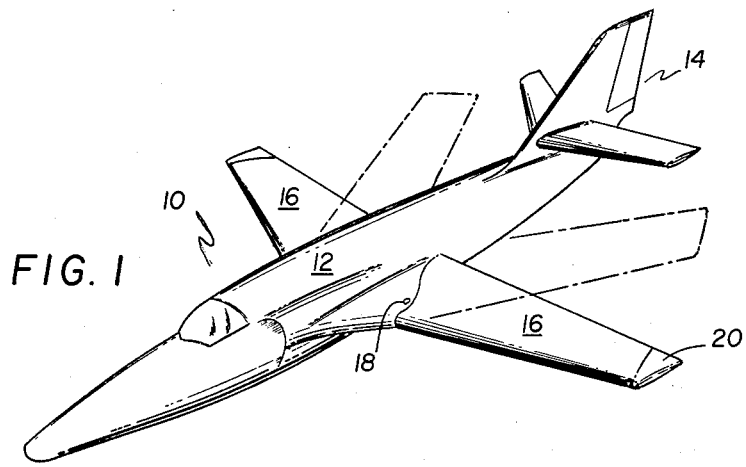
FIGURE 1 is a perspective view of an aircraft showing two swept wing positions.
Figure 2:
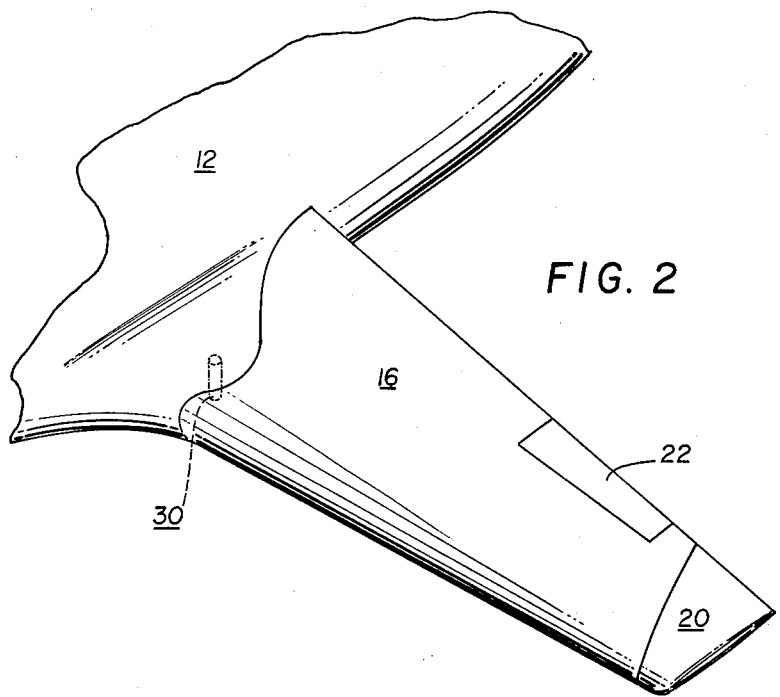
FIGURE 2 is an enlarged, fragmentary perspective view of the wing and wing support structure of FIGURE 1.

FIGURE 1 is representative of variable sweep wing aircraft in which the present motion transfer system has its principal application. The aircraft 10 has a fuselage 12, empennage 14, and wing sections 16 which pivot about an upright axis 18 from the solid-line extended position to the dashed-line retracted position. All or part of the wing may be thus swept and in each case wing structure is pivoted from supporting wing or fuselage structure which is fixed relative to the fuselage. The motion transfer means may also have application to pivoted wing aircraft in which wing structure is pivoted about a horizontal axis for V/STOL operation. An example of such pivoted wing aircraft is found in the copending patent application, S.N. 93,686, filed March 6, 1961 (Gary E. King, inventor), and the application of the present invention to pivoted wing aircraft will be readily understood by those skilled in the art.

Wings 16 have wing tip ailerons 20 for lateral control in wing-swept or high speed position and have trailing edge ailerons 22 for lateral control in extended or low speed position. Other control surfaces may utilize my motion transfer means such as spoilers, flaps, etc. When the expression "control surface" is used in the claims it is defined as being inclusive of spoilers. When the expression "means to affect aircraft attitude" is used in the claims this is inclusive of not only control surfaces but other means to affect aircraft attitude such as vector nozzles.

Motion transfer means 30 is positioned adjacent upright wing pivot axis 18. A wing-to-fuselage hinge structure 32 is shown in FIGURE 4 of a general type found in other hinge assemblies. Hinge 32 has a clevis arrangement in which an eyelet 34 secured to wing structure is interfingered with bifurcations 36 of clevis member 38 extending from fuselage structure 39. The clevis pin 40 is tubular and has a flanged head 42 and an externally threaded end portion 44 engaged with an internally threaded nut 46. A bearing system may be desirable between hinge clevis pin 40 and clevis 38 and between clevis 38 and eyelet 34, but this is a matter of routine design and is not shown.

Passing through the tubular bore of clevis pin 40 are torque tubes 43, 45. Torque tubes 43, 45 are rotatably supported concentric with wing pivot axis 18. Inner tube 43 has end cylindrical pintles or journals 47 fitting in bearing seats 48 in fuselage structure 50, 51. The tubes are spaced and rotatably supported relative to each other by bearings 52.

Figure 8:
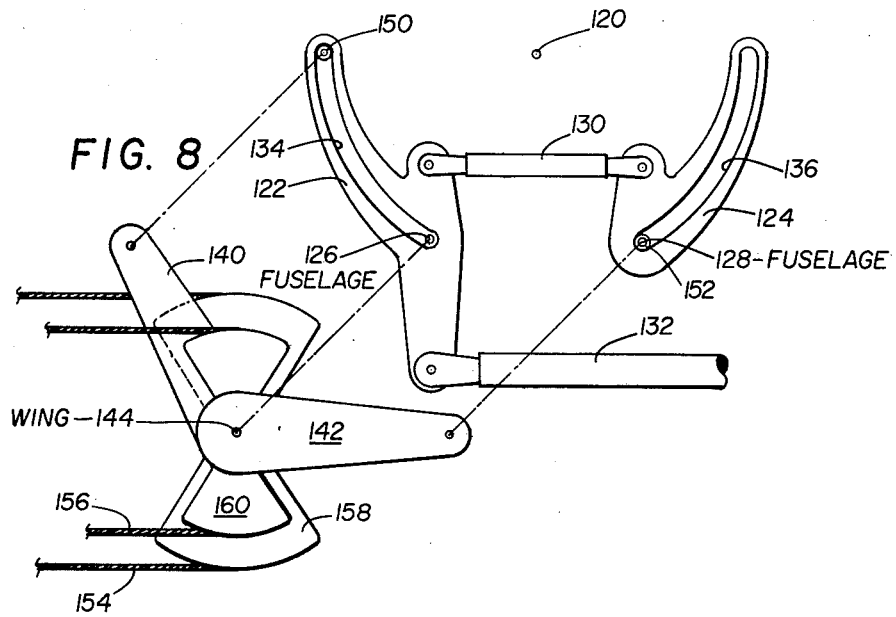
FIGURE 8 is a schematical view of a modified form of my motion transfer means with certain structure shown in a second displaced position to reveal structure that otherwise would be concealed.
Figure 9:
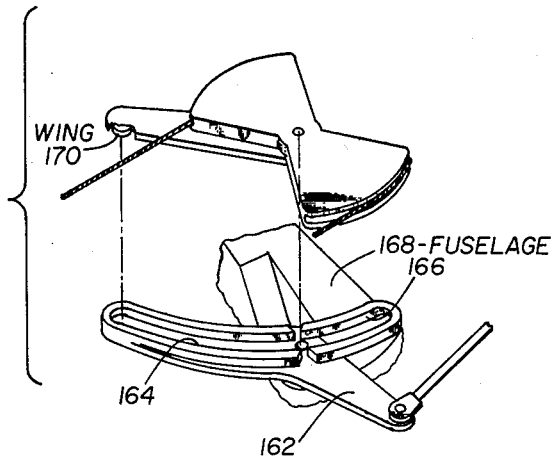
FIGURE 9 is a view of portions of the assembly of FIGURE 8.

Extending from the upper ends of torque tubes 43, 45 are torque arms 54, 56, respectively. Control rods 58, 60 are pivotally connected to arms 54, 56 and are directly or indirectly connected to trailing edge aileron 22 and wing tip aileron 20, respectively. Beneath hinge structure 32, another, lower pair of torque arms 62, 64 extend from torque tubes 43, 45, whereby the arms from the tubes in effect form pairs of offset bell cranks having a common pivotal axis 18. Although arms 54, 56 and 62, 64 have spaced upper and lower locations in this illustration, they could all be disposed in an upper or a lower location, depending on the aircraft design problem such as other structure or systems requiring space adjacent the wing pivot axis. The form of the invention shown in FIGURES 8 and 9 is responsive to another aircraft situation in which it is desired to clear the location of axis 18 as much as possible or to provide asymmetrical instead of symmetrical disposition relative to the wing pivot axis.

A pair of input bell cranks 68, 70 are located diametrically opposite and equidistant from wing pivot axis 18. These cranks are pivotally secured to fuselage structure 50 by bolts 66. A link 72 connects the cranks to pivot together. The cranks are pivoted responsive to pilot operable control means connected to an extension 76 of bell crank 68 by a rod or link 74. Normally the pilot operable control means for ailerons will be the stick. When the expression "pilot operable control means" is used in the claims it is defined as including various appropriate control means in the cockpit which may be pilot and/or autopilot controlled.

Bell cranks 68, 70 have on their upper surfaces bosses 82, 84 within which are formed arcuate cam tracks, slots or grooves 86, 88. Cam tracks 86, 88 are radiused on a circle having its center approximately on axis 18 in the neutral position of the pilot operable control means (as cranks 68, 70 are pivoted by link 74 the centers of the radiuses of course move from axis 18).

Caging cam slots 90, 92 are formed in bosses 94, 96 in fuselage structure 50 and may be considered extensions of cam slots 86, 88. The adjacent ends of bosses 82, 84, 94, 96 do not actually abut but instead are relieved at 100 to permit bell cranks 68, 70 to pivot relative to bosses 94, 96. The pivotal axes as defined by the bolts 66 of the cranks are centered at the groove ends so that this pivoting action does not disturb the groove end alignments. Links 108, 110 are pivoted to wing structure 112 by bolts 114 and have at their other ends cam followers 104, 106 disposed in grooves 86, 88, 90, 92. Note that the pivot axes as defined by the bolts 114 for these links are preferably located on the same circle referred to above on which the arcs of the grooves are formed. Second links 116, 118 are pivotally connected at their ends to cranks 62, 64 and to the follower ends of links 108, 110.

During the wing pivoting it may be considered that link 74 to the pilot operable control means, cranks 68, 70, and fuselage portion 50 in which slots 90, 92 are formed, are fixed relative to the fuselage and that links 58, 60 to the control surfaces, torque tubes 43, 45 and their arms 54, 56, 62, 64, links 116, 118 and links 108, 110, together with their pivotal support by wing structure 112, all move with the wing structure. As the only connection between these two sets are followers 104, 106 in the various grooves, control surface movement will not result from wing pivoting because the grooves are arcuate about the axis of relative rotation at 18.

The operation of the motion transfer means shown in FIGURES 3–7 will be further described in the following. The input of control movement through link 74 (FIGURE 5) results in pivoting of input cranks 68, 70. This will be ineffective to move links 108, 116, torque arm 62, torque arm 54 and rod 58 to trailing edge aileron 22. This can be taken as the retracted, high speed position of wing section 16 in which control is achieved through wing tip aileron 20.

The purpose of caging slots 92, 90 in the fuselage structure 50 is to receive followers 104, 106 when it is not desired to operate the responsive control surfaces. By receiving the follower within the caging slot, not only is the associated motion transfer means to the control surface made non-responsive to pivoting of input cranks 68, 70; but also the motion transfer means to the control surface is held in neutral position fixed against movement so that the control surface is not free to flap.

The degree of wing sweep in which a control surface is operative depends on the length of caging slots 90, 92 and, correspondingly, the length of slots 86, 88, in cranks 68, 70. It will be understood that during wing sweeping the motion transfer structure fixed relative to the fuselage moves relative to the structure fixed relative to the wing so that the followers 104, 106 will have different positions in slots 90, 92, 86, 88 as the wing is swept. Assuming in FIGURE 5 that the structure fixed relative to the fuselage is going to move counterclockwise relative to the structure fixed relative to the wing structure, the follower 104 of link 108 will move out of slot 90 and into slot 86. At the same time follower 106 of link 110 will move out of slot 88 and into caging slot 92.

In the FIGURE 5 position, follower 106 is disposed at the end of slot 88 whereby it will have maximum movement responsive to control input through link 74 causing pivoting of crank 70. This movement is transferred to link 118, torque arm 64, torque arm 56, and rod 60 to wing tip aileron 20.

It is commonly desirable in control surfaces of variably swept wings to have a gradual transition in the responsiveness of a control surface to pilot operable control means as the wing assumes various positions. In other words, control surfaces such as the ailerons, do not abruptly change from full maximum deflection responsive to control input, to zero at one position in wing sweep. Instead it is desirable for control surfaces to have maximum deflection at one of the maximum wing positions (either maximum extension or maximum sweep) and to gradually reduce in effectiveness as the wing structure is pivoted out of such maximum position. In the motion transfer position shown in FIGURE 5 (retracted wing position), wing tip 20 will have maximum responsiveness to pilot control. As the wing moves toward extended position the fuselage supported structure will pivot counterclockwise relative to the wing supported structure and follower 106 will have various positions in groove 88 whereby the follower will be moved more or less responsive to pivoting of crank 70. As this counterclockwise movement continues follower 106 eventually will reach a position superposed to crank pivot axis 66 (or will assume positions within caging slot 92) so that wing tip 20 will no longer move responsive to pilot control.

As the ratio of slot 88 to slot 92 is greater in crank 70 than the ratio of the length of slot 86 to slot 90 in crank 68, wing tip aileron 20 (associated with the former slots) will be effective for a greater angle of wing sweep than trailing aileron 22. The slots should have no position of wing sweep in which neither control surface is operable for lateral control.

Pivot points 114 for links 108, 110 are preferably located on the same circle as the grooves (as described above) to minimize any tendency for the control surfaces to have different up and down responsiveness to movements of control input rod 74.

It will be understood that one-half of the structure shown in FIGURES 3–7 may have application for a single control surface. The structure then would delete rod 60, arm 56, torque tube 45, arm 64, links 110, 118, crank 70, connecting link 72, etc. This would mean only one control surface or the like would move responsive to a control input from a rod such as 74. During wing sweep the control means would be phased in or out as the fuselage structure pivoted relative to the wing structure. Also the control surface would gradually change from maximum responsiveness to control input to zero. It also will be understood that the caging slots may be omitted and the structure designed, including the length of the slots and the crank pivot points, so that the control surfaces will never be completely phased out but merely minimized in effectiveness, or so that the followers become superposed to the input crank pivots at the maximum phased out position.

FIGURE 8 shows a modified form of the invention in which the wing pivot axis 120 is freed from motion transfer structure. Two input cranks 122, 124 are pivoted to fuselage structure at 126, 128, are connected together by link 130, and are pivoted responsive to pilot input by rod 132. Input cranks 122, 124 have grooves 134, 136 preferably arced approximately on a circle having (in the neutral position of the control means) its center approximately on axis 120. As the input cranks move together, a design situation may call for a single crank with two grooved arms, but individual cranks are more adaptable to most design situations.

Two output cranks 140, 142 are pivoted to wing structure on an axis 144. (The pivotal axis 144 is shown as being common to the two cranks, which usually will be convenient but is not a necessary limitation.) Output cranks 140, 142 have followers 150, 152 disposed respectively in groove tracks 134, 136. Control surfaces are connected to output cranks 140, 142 by cables 154, 156 engaged in grooved members 158, 160 secured to or formed integral with cranks 140, 142.

As the only connection between the structure fixed relative to the fuselage and the structure fixed relative to the wing structure are followers 150, 152 and grooves 134, 136, and as the grooves are preferably arcuate relative to the wing pivot axis, no control surface movement results from wing sweeping.

As in the structure of FIGURES 3–7, as the wing is adjusted in position relative to the fuselage the followers assume various positions in grooves 134, 136 resulting in a change in responsiveness of their respective control surfaces to control input through rod 132.

The pivotal axes of cranks 122, 124, 140, 142 are preferably all disposed on the same circle on which grooves 134, 136 are arced to avoid having different responsiveness to pilot control input in up and down control surface movement.

FIGURE 9 details a caging slot integrated into the structure of FIGURE 8. (The general relationships between the crank grooves and the caging slots are similar to those found in FIGURES 3–7.) In this showing an input crank 162 has a groove 164 with an open end aligning with the open ended caging slot 166 formed in structure 168 fixed relative to the fuselage. The respective follower 170 during wing sweeping moves out of slot 164 of crank 162 and into caging slot 166.

Having thus specifically described my invention, I do not wish to be understood as limiting myself to the precise details of construction shown but instead wish to cover those modifications thereof that will occur to those skilled in the art from my disclosure and that fairly fall within the scope of my invention, as described in the following claims.

I claim:
1. In an aircraft
   (a) having wing structure variably swept by pivoting about an upright axis from supporting structure fixed relative to the fuselage,
   (b) said wing structure having a pair of control surfaces to have differing responses in various wing sweep positions to a common pilot operable control means from the fuselage,
motion transfer means between said control means and said control surfaces, comprising:
   (a) (i) a first and a second input crank connected to said control means in a manner to pivot together,
   (ii) the input cranks being pivoted to said supporting structure at points spaced from said upright axis,
   (iii) each input crank having a groove arced approximately on a circle having (in the neutral position of said control means) its center approximately on said upright axis,
   (iv) a first link for each input crank pivoted to said wing structure at one end at a location approximately on said circle associated with its crank and having a follower at its other end disposed in said groove of its crank, whereby sweeping of said wing structure will not cause pivoting of said first link relative to said wing structure as said follower moves along the associated groove,
   (b) (i) a first and a second output crank mounted to pivot substantially about said upright axis by means including concentric torque tubes and bearings for the torque tubes,
   (ii) each torque tube being connected to one of said control surfaces to move the same upon pivoting of the torque tube,
   (iii) a second link associated with each first link, each second link being pivotally connected at one end to the follower end of its first link and being pivotally connected to one of said output cranks at its other end,
   (c) said followers being positioned oppositely in said grooves whereby when one follower is positioned in the end of its groove giving it maximum movement responsive to pivoting of the associated input crank, the other follower is positioned in the end of its groove giving it minimum movement responsive to pivoting of its input crank, whereby on wing sweeping one control surface tends to decrease and the other control surface to increase in its responsiveness to control means.

2. The subject matter of claim 1 in which each input crank has its pivotal axis substantially on said circle associated with its groove, whereby like angular movement thereof produces like deflection of the associated control surface at either side of the neutral position of the control surface.

3. The subject matter of claim 1 in which each input crank has its pivotal axis substantially within its groove whereby on wing sweeping the associated follower may be brought into superposition with that pivotal axis to thereby result in zero movement of the associated control surface due to control means movement.

4. The subject matter of claim 1 in which said grooves each have an open end and the pivotal axis of the associated input crank is substantially at said open end, and a cage secured to said supporting structure having a caging slot with an open end mating with the open end of each of said grooves, whereby the follower associated with each groove may be received in the respective caging slot so that the associated control surface is held in neutral position after reaching zero responsiveness to said control means.

5. The subject matter of claim 4 in which said grooves have different lengths whereby said control surfaces differ in the angular extents of wing sweeping in which they are responsive to said control means.

6. In an aircraft having wing structure variably swept by pivoting about an upright axis from supporting structure fixed relative to the fuselage, said wing structure having a control surface to move responsive to pilot operable control means from the fuselage, motion transfer means between said control means and said control surface, comprising:
   a first and a second crank;
   said first crank being pivotally connected to said wing structure and being connected to said control surface to operate the same upon pivoting, and said first crank having a follower spaced from the crank axis;
   said second crank being pivotally connected to said supporting structure and being connected to said control means to be pivoted thereby and having a groove receiving said follower of said first crank, said groove being arced on a circle having its center substantially aligned with said upright axis when said control means is in neutral position, whereby in wing sweeping said follower will follow said arc without producing control surface movement and whereby the responsiveness of said control surface to control means will change with wing sweep as said follower assumes various positions in said groove.

7. The subject matter of claim 6 in which said first crank has its pivotal axis substantially on said circle whereby like angular movement thereof produces like deflection of said control surface at either side of the neutral position of the control surface.

8. The subject matter of claim 6 in which said second crank has its pivotal axis substantially within said groove whereby on wing sweeping said follower may be brought into superposition with that pivotal axis to thereby result in zero movement of said control surface due to control means movement.

9. The subject matter of claim 6 in which said groove has an open end and the pivotal axis of said second crank is substantially at said open end, and a cage secured to said supporting structure having a caging slot with an open end mating with the open end of said groove, whereby said follower may be received in said slot so that said control surface is held in neutral position after reaching zero responsiveness to said control means.

10. In an aircraft
 (a) having airfoil structure pivotally adjustable about an axis from supporting structure fixed relative to the fuselage,
 (b) said airfoil structure having means to affect aircraft attitude to have different responsiveness in various positions of said airfoil structure to control means from the fuselage,
motion transfer means, comprising:
 (a) (i) an input crank connected to said control means and pivoted to said supporting structure at a point spaced from said axis,
 (ii) said input crank having a groove arced approximately on a circle having (in the neutral position of said control means) its center approximately on said axis,
 (iii) a first link pivoted to said airfoil structure at one end at a location approximately on said circle and having a follower at its other end disposed in said groove, whereby pivoting of said airfoil structure will not cause pivoting of said first link relative to said airfoil structure as said follower moves along said groove,
 (b) (i) an output crank mounted to pivot substantially about said axis and having means connected to said first-mentioned means to operate the same upon pivoting of said output crank,
 (ii) a second link pivotally connected at one end to the follower end of said first link and being pivotally connected to said output crank at its other end.

11. In an aircraft having airfoil structure pivotally adjustable about an axis from supporting structure fixed relative to the fuselage, said airfoil structure having means to affect aircraft attitude to have different responsiveness in various positions of said airfoil structure to control means from the fuselage, motion transfer means, comprising:
 a first and a second crank;
 said first crank being pivotally connected to said airfoil structure and being connected to said first-mentioned means to operate the same upon pivoting, and said first crank having a follower spaced from the crank axis;
 said second crank being pivotally connected to said supporting structure and being connected to said control means to be pivoted thereby and having a groove receiving said follower of said first crank, said groove being arced on a circle having its center substantially aligned with the first-mentioned axis when said control means is in neutral position, whereby in pivotal adjustment of said airfoil structure said follower will follow said arc without operating said first-mentioned means and whereby the responsiveness of said first-mentioned means to said control means will change with said pivotal adjustment as said follower assumes various positions in said groove.

12. In an aircraft
 (a) having wing structure variably swept by pivoting about an upright axis from supporting structure fixed relative to the fuselage,
 (b) said wing structure having a control surface to have differing responses in various wing sweep positions to pilot operable control means from the fuselage,
motion transfer means between said control means and said control surface, comprising:
 (a) an input crank and an output crank connected respectively to said control means and to said control surface,
 (b) means connecting said cranks together to transmit movement therebetween including a follower on one crank and means forming a track for the follower on the other crank, the track being arced on a circle having said upright axis as its center in the neutral position of said control means, whereby during wing sweeping said follower may follow along said track without producing control surface movement and whereby during wing sweeping said follower will assume different positions along said track thereby changing responsiveness of said control surface to said control means.

13. In an aircraft
 (a) having airfoil structure pivotally adjustable about an axis from supporting structure fixed relative to the fuselage,
 (b) said airfoil structure having means to affect aircraft attitude to have different responsiveness in various positions of said airfoil structure to control means from the fuselage,
motion transfer means, comprising:
 (a) an input crank and an output crank connected respectively to said control means and to said first-mentioned means,
 (b) means connecting said cranks together to transmit movement therebetween including a follower on one crank and means forming a track for the follower on the other crank, the track being arced on a circle having said axis as its center in the neutral position of said control means, whereby during airfoil pivoting said follower may follow along said track without operating said first-mentioned means and whereby during airfoil pivoting said follower will assume different positions along said track thereby changing responsiveness of said first-mentioned means to said control means.

14. In an aircraft
 (a) having airfoil structure pivotally adjustable about an axis from supporting structure fixed relative to the fuselage,
 (b) said airfoil structure having first and second means to affect aircraft attitude to have different responsiveness in various positions of said airfoil structure to control means from the fuselage,
motion transfer means, comprising:
 (a) input crank means supported by said supporting structure connected to said control means to be pivoted thereby,
 (b) said input crank means including two tracks each arced on a circle having said axis as its center in the neutral position of said control means,
 (c) a first and a second output crank connected to said first and second means to affect aircraft attitude, each output crank having a follower engaged with one of said tracks, whereby during airfoil pivoting said followers may follow along said tracks without operating said first and second means and whereby during airfoil pivoting said followers will assume different positions along said tracks thereby changing responsiveness of said first and second means to said control means, said followers being positioned oppositely relative to their tracks whereby during wing pivoting when one of said first and second means becomes less responsive to said control means the other becomes more responsive.

References Cited in the file of this patent
UNITED STATES PATENTS
2,665,085   Crocombe et al. _____ Jan. 5, 1954